US011461658B2

(12) United States Patent
Li et al.

(10) Patent No.: US 11,461,658 B2
(45) Date of Patent: Oct. 4, 2022

(54) TIME SERIES DEEP SURVIVAL ANALYSIS SYSTEM IN COMBINATION WITH ACTIVE LEARNING

(71) Applicant: ZHEJIANG LAB, Hangzhou (CN)

(72) Inventors: Jingsong Li, Hangzhou (CN); Tianshu Zhou, Hangzhou (CN); Ziyue Yang, Hangzhou (CN); Shengqiang Chi, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/541,298

(22) Filed: Dec. 3, 2021

(65) Prior Publication Data

US 2022/0092430 A1 Mar. 24, 2022

Related U.S. Application Data

(63) Continuation of application No. PCT/CN2021/071792, filed on Jan. 14, 2021.

(30) Foreign Application Priority Data

Jan. 14, 2020 (CN) ......................... 202010038992.2

(51) Int. Cl.
*G06N 3/08* (2006.01)
*G06K 9/00* (2022.01)
(Continued)

(52) U.S. Cl.
CPC ......... *G06N 3/086* (2013.01); *G06K 9/00536* (2013.01); *G06K 9/6285* (2013.01); *G06N 3/0454* (2013.01); *G06N 3/088* (2013.01)

(58) Field of Classification Search
None
See application file for complete search history.

(56) References Cited

U.S. PATENT DOCUMENTS

2004/0010481 A1 1/2004 Mani et al.
2018/0005151 A1* 1/2018 Liao .................. G05B 23/0283
(Continued)

FOREIGN PATENT DOCUMENTS

CN 104901908 A 9/2015
CN 105678104 A 6/2016
(Continued)

OTHER PUBLICATIONS

Sung JM, Cho I-J, Sung D, Kim S, Kim HC, Chae M-H, et al.; Development and verification of prediction models for preventing cardiovascular diseases; PLoS One 14(9); 2019; pp. 1-12 (Year: 2019).*
(Continued)

*Primary Examiner* — Alan Chen
(74) *Attorney, Agent, or Firm* — W&G Law Group

(57) ABSTRACT

Provided is a time series deep survival analysis system combined with active learning. The system includes: a data collection module, an active learning module, and a time series deep survival analysis module; the data collection module is used for obtaining survival data of objects to be analyzed; combined with an active learning method, the active learning module selects a part of right censored data to label a survival time; and the time series deep survival analysis module constructs a time series deep survival analysis neural network model, and takes uncensored data and right censored data as model inputs, so as to obtain survival time prediction results of the objects to be analyzed. The present application can make full use of the right censored data in the survival data and time series features.

5 Claims, 3 Drawing Sheets

(51) Int. Cl.
*G06K 9/62* (2022.01)
*G06N 3/04* (2006.01)

(56) References Cited

U.S. PATENT DOCUMENTS

2019/0256924 A1* 8/2019 Vogelstein ............. C12Q 1/686
2020/0134430 A1* 4/2020 Yamashita ............. G06V 10/82
2021/0301326 A1* 9/2021 Ismagilov ............. C12Q 1/689

FOREIGN PATENT DOCUMENTS

CN 107273718 A 10/2017
CN 108922628 A 11/2018
CN 111312393 A 6/2020

OTHER PUBLICATIONS

Oh et al., Relaxed Parameter Sharing: Effectively Modeling Time-Varying Relationships in Clinical Time-Series; Proceedings of Machine Learning Research 106; pp. 1-25; 2019 (Year: 2019).*
International Search Report (PCT/CN2021/071792); dated Apr. 2, 2021.
A Study on Effects of Censoring Proportions to Cox Regression Model in Survival Analysis; Date of Mailing: Jan. 15, 2010.
Active Learning based Survival Regression for Censored Data; Date of Mailing: Nov. 30, 2014.

* cited by examiner

TIME SERIES DEEP SURVIVAL ANALYSIS SYSTEM IN COMBINATION WITH ACTIVE LEARNING

CROSS-REFERENCE TO RELATED APPLICATIONS

The present application is a continuation of International Application No. PCT/CN2021/071792, filed on Jan. 14, 2021, which claims priority to Chinese Application No. 202010038992.2, filed on Jan. 14, 2020, the contents of both of which are incorporated herein by reference in their entireties.

TECHNICAL FIELD

The present application belongs to the medical field, and in particular relates to a time series deep survival analysis system combined with active learning.

BACKGROUND

Survival analysis refers to an analysis method that comprehensively analyzes whether an event will occur and when it occurs. The relationship between a survival time, an ending and many influence factors with the degree can be studied. Survival analysis is widely used in the fields of medicine, biology, finance and the like, and it has very important research significance and research values. The goal of the survival analysis is to analyze and predict the occurrence condition of an event on an observation object by observing the event that has occurred. Through the survival analysis, we hope to obtain the characteristics of the survival condition of the study object in terms of time, estimate the survival rate and the average survival time, and then study protective factors and unfavorable factors that affect the survival time and the observation time.

A major feature in the survival analysis problem is the existence of a data censoring phenomenon in survival data. Data censoring refers to a phenomenon that the survival time of the object is not completely observed during the observation process of the study object, resulting in incomplete survival data. In actual observation experiments, due to various limitations of observation methods or observation objects, observation data are often incomplete.

In the medical field, on the basis of electronic health record data, researchers can use the survival analysis method to analyze and evaluate the importance of many risk factors to death, cancer recurrence and other ending events, which plays a very important role in evaluating the role of prognostic factors, assisting clinical decision making, and realizing personalized customization of treatment plans. For example, in the analysis of postoperative survival times of kidney transplant patients, a patient queue is composed of all patients who have undergone kidney transplant surgeries, the ending event is the death of the patient, and the survival time refers to the time from the kidney transplant surgery to the death of the patient. In the medical field, clinical data is usually high-dimensional, sparse and complex, and there are often cases where the occurrence time of the ending event (uncensored instance) is relatively short. Therefore, it is challenging to establish an accurate survival model from electronic health records.

Traditional statistical-based survival analysis models are mainly divided into three categories, including: non-parametric, semi-parametric and parametric methods. The parameter method refers to knowing a distribution model of survival time, then estimating model parameters according to data, and finally calculating the survival rate by using the distribution model. The non-parametric method refers to that the distribution of survival time is not required, and the survival rate is estimated based on sample statistics. Common methods are the Kaplan-Meier method and a lifetime method. Neither method can evaluate the role of risk factors. The semi-parametric method does not need to estimate the distribution of survival time, and can be used for evaluating the factors affecting the survival rate through a model. The most common is a Cox regression model. Although a Cox proportional hazard model is widely used in survival analysis research, it is based on two basic assumptions: first, proportional hazard assumption, that is, the role of each risk factor does not change with time; and second, linear relationship assumption, that is, the logarithm of risk ratio is a linear combination of a series of covariates. The two assumptions are often not satisfied in practical applications, which greatly limits the application effect of the model.

In response to the linear assumption problem of the Cox proportional hazards model, researchers have developed a survival neural network to deal with the nonlinear relationship in the survival analysis model. The survival neural network is equivalent to deep survival analysis, its simple principle is to replace an immutable risk ratio $\beta$ in the Cox proportional hazard model with a variable output h of the neural network, and python packages such as Deep Surv have been proposed now.

However, due to the various limitations of the observation methods or the observation objects, the electronic medical record data contains few clear time points of the ending event, that is, the number of patients who have been observed to die is small, and the survival data of a large part of the patients are right censored due to the reasons of being discharged, transferred, lost to follow-up or are still alive so far. The right censored data account for more than 90% of the survival data. The existing survival neural networks, represented by Deep Surv, have poor performance in dealing with the survival analysis problem based on electronic medical records and with a high censored ratio, which greatly limits the application of the model in the medical and health field.

On the other hand, the medical electronic health data are often time series, and their features are closely related to time. However, the traditional Cox proportional hazard model and the survival neural networks, represented by Deep Surv, based on convolutional neural networks are not able to use the time series features of the data.

SUMMARY

Aiming at the deficiencies of the prior art, the present application provides a time series deep survival analysis system combined with active learning.

The purpose of the present application is achieved through the following technical solution: a time series deep survival analysis system combined with active learning, including: a data collection module, an active learning module, and a time series deep survival analysis module.

The data collection module is configured to obtain survival data of objects to be analyzed.

Combined with an active learning method, the active learning module selects a part of right censored data to label a survival time (the time experienced from a beginning event to an ending event), which is specifically as follows:

(1) putting all the survival data (including uncensored data and the right censored data) in a preparatory training set pool, wherein time series features, survival times and whether censoring of all the objects to be analyzed are stored in the preparatory training set pool;

(2) using a cox risk proportional regression model to perform cox regression analysis on a preparatory training set, so as to calculate a concordance index (Concordance Index, C-index)$C_0$;

(3) putting all the right censored data in a censored data pool, wherein the time series features and censoring times (the times experienced from the beginning event to censoring) of all the objects to be analyzed are stored in the censored data pool;

(4) combined with the active learning method, according to a novel sampling strategy, sorting the data in the censored data pool, wherein the specific steps are as follows:

(4.1) for each data instance $I_i$ in the censored data pool, performing cox regression analysis on the data instance and all the uncensored data, so as to calculate a concordance index $C_i$, and meanwhile calculating a change in the concordance index $\Delta C_i = C_i - C_0$; and (4.2) sorting the $\Delta C_i$ of the data instances in the censored data pool in an order from greatest to least (the higher the ranking is, the greater the improvement effect of the instance on the model is, and the greater the reference value of the instance is); and (5) selecting the most important batch of right censored data ranked first, labeling the survival time of the selected right censored data (for example, in the form of follow-up phone call), updating the labeled data into the preparatory training set pool, recording whether censoring as NOT; so far, a part of the right censored data has been labeled according to the novel sampling strategy, a preparatory training set with improved quality and containing both the uncensored data and the right censored data is obtained, and the next step is to learn a time series deep survival analysis network by using the training set.

The time series deep survival analysis module constructs a time series deep survival analysis neural network model, and takes the uncensored data and the right censored data as model inputs, so as to obtain survival time prediction results of the objects to be analyzed;

the time series deep survival analysis neural network model includes a time series data input layer, a bidirectional LSTM recurrent neural network layer, an attention mechanism layer, a fully connected layer and a softmax output layer, which are sequentially connected;

the survival time or the censoring time of each object to be analyzed is divided into k intervals at an interval of m days, so as to obtain an interval tag of each object to be analyzed, and the survival analysis problem is converted into a multi-category tag classification prediction problem;

the survival data, the survival time tag and whether censoring in the preparatory training set are input into the time series data input layer of the network model, and by means of the softmax output layer, each input data instance will output k values: $h_0, h_1, h_2 \ldots h_{k-1}$, representing the probabilities that the ending event occurs in the 0, 1 . . . (k−1) intervals, respectively;

a loss function $\text{Loss}_{all}$ of the time series deep survival analysis neural network model consists of two parts, which are respectively denoted as $\text{Loss}_1$ and $\text{Loss}_2$:

$$\text{Loss}_1 = -\log \Pi_{(X,T)\in D_{uncensored} \mid (X,T)\in D_{censored}} S(T-1 \mid X) = -\Sigma_{(X,T)\in D_{uncensored} \mid (X,T)\in D_{censored}} \log [\Pi_{l:l\leq(T-1)}(1-h_l)] = -\Sigma_{(X,T)\in D_{uncensored} \mid (X,T)\in D_{censored}} \Sigma_{l:l\leq(T-1)} \log(1-h_l)$$

$$\text{Loss}_2 = -\log \Pi_{(X,T)\in D_{uncensored}} Pr(z=T \mid X) = -\log \Pi_{(X,T)\in D_{uncensored}} [h_T \Pi_{l:l\leq T}(1-h_l)] = -\Sigma_{(X,T)\in D_{uncensored}} [\log h_T + \Sigma_{l:l\leq T} \log(1-h_l)]$$

$$\text{Loss}_{all} = \text{Loss}_1 + \text{Loss}_2$$

wherein X represents the sum of the time series features of the data, including the time series features of s step lengths: $X_0, X_1, X_2 \ldots X_{s-2}, X_{s-1}$; T represents an interval tag to which the survival time or the censoring time of the data is divided; $D_{uncensored}$ and $D_{censored}$ represent a set of uncensored data and a set of censored data, respectively; $h_a$ represents the probability that the ending event occurs in the $a^{th}$ interval; z represents the interval tag to which the survival time or the censoring time predicted by the model is divided, and the calculation formula of z is $z=\text{argmax}([h_0, h_1, h_2 \ldots h_{k-1}])$; $S(t \mid x)$ represents the probability that the ending event still does not occur at the end of the time t where the feature of the data is X, and $Pr(z=T \mid X)$ represents the probability of z=T, where the feature of the data is X.

Further, the system further includes a result display module for displaying the survival time prediction results.

Further, a dropout layer is added after each layer of recurrent neural network in the bidirectional LSTM recurrent neural network layer, so as to avoid over-fitting.

Further, the time-series deep survival analysis neural network model is trained by using mini-batching and Adam optimizer, and meanwhile L1 and L2 regularization are utilized to avoid over-fitting.

Further, the system is applied in the medical and health field, medical electronic health records are time series data, and features thereof are closely related to time, right censored data thereof accounts for a relatively high proportion in the survival data, the survival data is extracted from the medical electronic health records through the data collection module, and a survival time of a patient is finally predicted by the system.

The beneficial effects of the present application are: according to actual needs, the present application establishes a time series deep survival analysis system combined with active learning in view of the shortcomings of the existing traditional survival analysis methods and deep survival neural network models. Therefore, in the deep survival analysis research based on the medical electronic health records, the right censored data in the survival data and the and the time series features can be fully utilized. Compared with the traditional survival analysis models, it solves the problem of difficulty in processing high-dimensional medical and health data. Compared with the previous deep survival analysis neural networks, it solves the problem that when there is only a small amount of uncensored data in survival analysis, namely when the censoring ratio is very high, the performance of the model is poor. At the same time, it increases the extraction and utilization of time dimension features of the data, thereby expanding the application range of the model, and improving the manifestation effect of the model.

DESCRIPTION OF EMBODIMENTS

Figure 1:
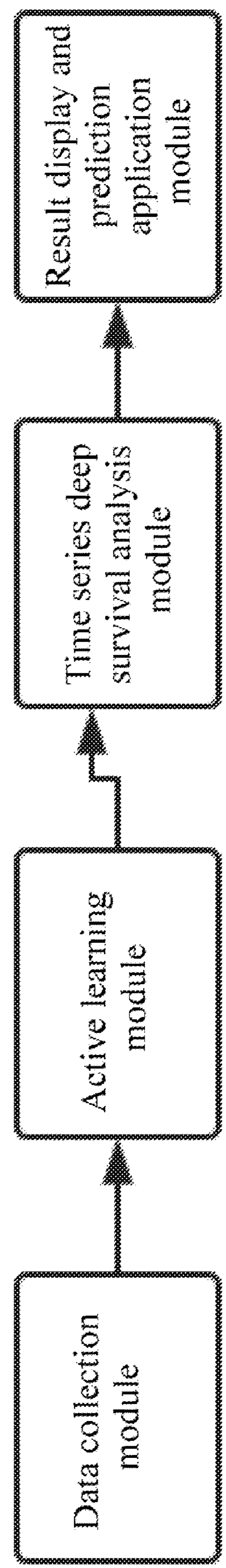
FIG. 1 is a structural block diagram of a time series deep survival analysis system combined with active learning proposed by the present application.
Figure 2:
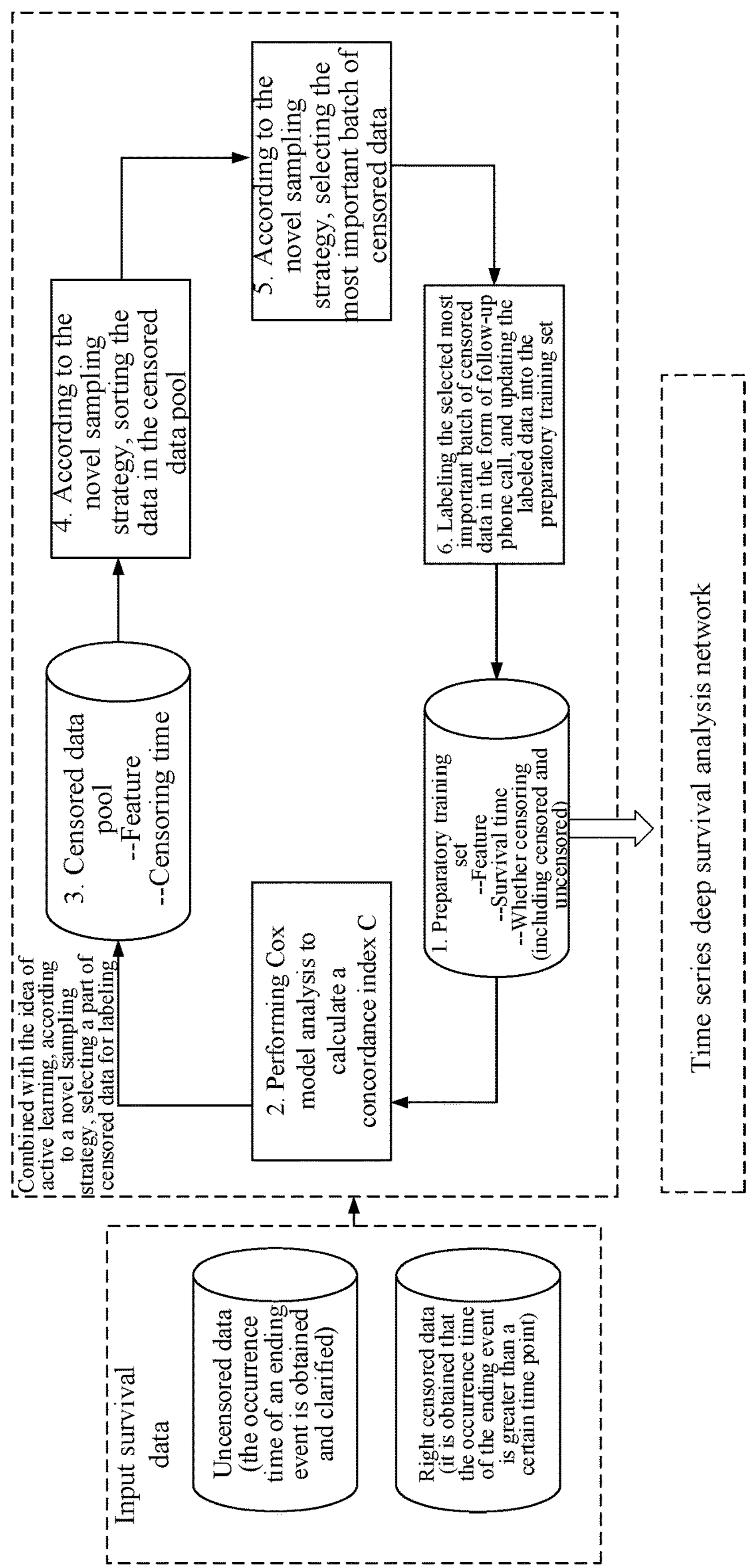
FIG. 2 is a schematic flow diagram of labeling a part of selected right censored data combined with the idea of active learning.
Figure 3:
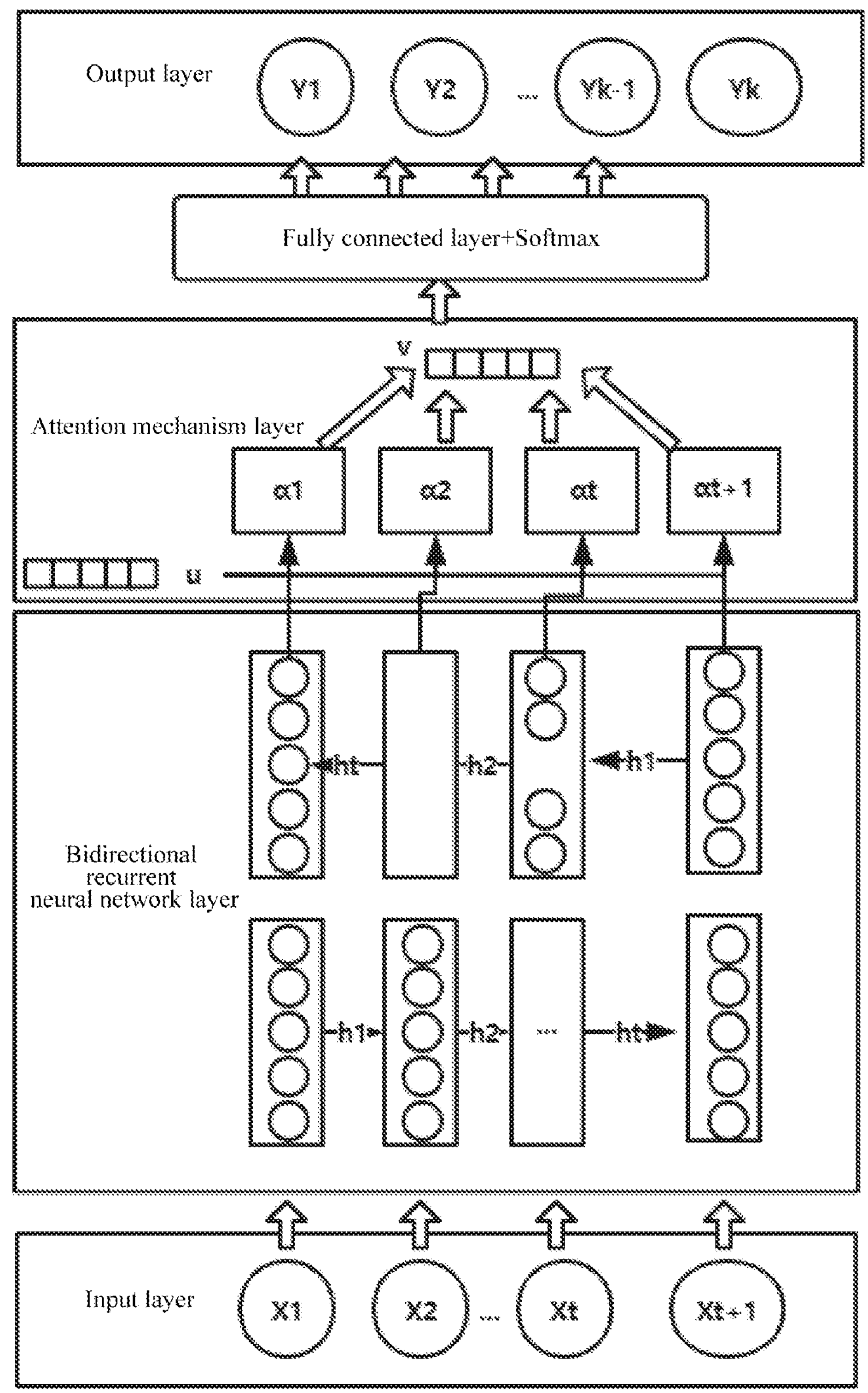
FIG. 3 is a schematic structural diagram of a time series deep survival analysis network.

The present application will be further described in detail below with reference to the drawings and specific embodiments.

Censored data in survival analysis is usually divided into three conditions: left censored, right censored, and interval censored:

Left censored (Left Censored): refers to that the occurrence time of an ending event can only be determined to be before a certain point.

Right censored (Right Censored): refers to that the occurrence time of the ending event can only be determined to be after a certain point.

Interval censored (Interval Censored): refers to that the occurrence time of the ending event can be determined to be within a certain time interval.

Failure data (Failure Data): refers to that the occurrence time point of the ending event is accurately observed to obtain complete survival data.

A Cox regression model, also known as a proportional hazard model, analyzes the relationship between a time when a certain ending (such as death) occurs and risk factors. The Cox model can be understood as two parts: a basic risk (the ending event occurs) function, which represents the occurrence risk of the ending event that changes with time; and an effect parameter, which indicates a change in the basic risk function when a certain exposure (risk) factor exists. A proportional risk refers to that the change of the exposure (risk) factor to the basic risk function is multiplicative. The exposure (risk) factor is not necessarily divided into two categories, but can also be continuous. If the exposure (risk) factor is continuous, what is analyzed is how many times the change in per unit X causes the occurrence risk of the ending event to increase (or decrease).

In a machine learning task, due to the high cost of data labeling, we are also faced with the problem of how to obtain the most effective learning model with the smallest number of samples. If we can start from the task to formulate standards through the understanding of the task, and select the most important samples to make them most helpful to the learning process of the model, the cost of supervised learning will be greatly reduced. Active learning is an important means to solve this problem. Although there is very little labeled data, a lot of unlabeled data can be obtained cheaply. There is a labeling expert in active learning, and we can iteratively select a part of important data from the unlabeled data for labeling, so as to obtain more labeled data. Therefore, the goal of active learning is to obtain the best learning model with the smallest labeling cost. The core problem in active learning is the need to formulate standards, so that the selected samples are indeed the most helpful for the model.

The following is an example of applying a time series deep survival analysis system combined with active learning to the medical and health field: predicting the postoperative survival time of a kidney transplant patient. The system extracts time series survival data of the kidney transplant patient after three months of the surgery from medical electronic health records by means of a data collection module, and the system finally predicts the survival time of the patient.

In the medical and health field, the survival analysis method based on electronic health record data can be used for analyzing and evaluating the impact of many risk factors on death, cancer recurrence and other ending events, thereby playing a very important role in evaluating the role of prognostic factors, assisting clinical decision making, and realizing personalized customization of treatment plans. Due to the characteristics of high dimension, sparsity, large portion of right censored data and time dependence of the survival data in the medical electronic health records, the application of the previous survival analysis methods in the medical and health field is restricted to a certain extent.

A time series deep survival analysis system combined with active learning proposed in this embodiment makes it possible to make full use of right censored data in survival data and time series features in deep survival analysis research based on electronic health records.

The system includes: a data collection module, an active learning module, and a time series deep survival analysis module;

the data collection module is configured to obtain survival data of kidney transplant patients.

combined with an active learning method, the active learning module selects 20% of right censored data to label a survival time (the time experienced from a beginning event to an ending event), which is specifically as follows:

(1) putting all the survival data (including uncensored data and the right censored data) in a preparatory training set pool, wherein time series features, survival times and whether censoring of all the kidney transplant patients are stored in the preparatory training set pool;

(2) using a cox risk proportional regression model to perform cox regression analysis on a preparatory training set, so as to calculate a concordance index (Concordance Index, C-index)$C_0$;

(3) putting all the right censored data in a censored data pool, wherein the time series features and censoring times (the times experienced from the beginning event to censoring) of all the kidney transplant patients are stored in the censored data pool;

(4) combined with the active learning method, according to a novel sampling strategy, sorting the data in the censored data pool, wherein the specific steps are as follows:

(4.1) for each data instance $I_i$ in the censored data pool, performing cox regression analysis on the data instance and all the uncensored data, so as to calculate a concordance index $C_i$, and meanwhile calculating a change in the concordance index $\Delta C_i = C_i - C_0$; and (4.2) sorting the $\Delta C_i$ of the data instances in the censored data pool in an order from greatest to least (the higher the ranking is, the greater the improvement effect of the instance on the model is, and the greater the reference value of the instance is); and (5) selecting the right censored data in the top 20%, labeling the survival time of the selected right censored data in the form of follow-up phone call, updating the labeled data into the preparatory training set pool, recording whether censoring as NOT; so far, a part of the right censored data has been labeled according to the novel sampling strategy, the portion of the right censored data in the preparatory training set pool is reduced, a preparatory training set with improved quality and containing both the uncensored data and the right censored data is obtained, and the next step is to learn a time series deep survival analysis network by using the training set.

The time series deep survival analysis module constructs a time series deep survival analysis neural network model, and takes the uncensored data and the right censored data as model inputs, so as to obtain survival time prediction results of the kidney transplant patients;

the time series deep survival analysis neural network model includes a time series data input layer, a bidirectional LSTM recurrent neural network layer, an attention mechanism layer, a fully connected layer and a softmax output layer, which are sequentially connected;

the survival time or the censoring time of each kidney transplant patient is divided into 20 intervals at an interval of 365 days, so as to obtain an interval tag of each kidney transplant patient, and the survival analysis problem is converted into a multi-category tag classification prediction problem;

the survival data, the survival time tag and whether censoring in the preparatory training set are input into the time series data input layer of the network model, and by means of the softmax output layer, each input data instance will output 20 values: $h_0, h_1, h_2 \ldots h_{k-1}$, representing the probabilities that the ending event occurs in the 0, 1 . . . 19 intervals, respectively;

a loss function $Loss_{all}$ of the time series deep survival analysis neural network model consists of two parts, which are respectively denoted as $Loss_1$ and $Loss_2$:

$$Loss_1=-\log \Pi_{(X,T)\in D_{uncensored}|(X,T)\in D_{censored}} S(T-1|X)=-\Sigma_{(X,T)\in D_{uncensored}|(X,T)\in D_{censored}} \log [\Pi_{l:l\leq(T-1)}(1-h_l)]=-\Sigma_{(X,T)\in D_{uncensored}|(X,T)\in D_{censored}} \Sigma_{l:l\leq(T-1)} \log (1-h_l)$$

$$Loss_2=-\log \Pi_{(X,T)\in D_{uncensored}} Pr(z=T|X)=-\log \Pi_{(X,T)\in D_{uncensored}}[h_T \Pi_{l:l\leq T}(1-h_l)]=-\Sigma_{(X,T)\in D_{uncensored}}[\log h_T+\Sigma_{l:l\leq T} \log(1-h_l)]$$

$$Loss_{all}=Loss_1+Loss_2$$

Wherein; X represents the sum of the time series features of the data, including the time series features of s step lengths: $X_0, X_1, X_2 \ldots X_{s-2}, X_{s-1}$; T represents an interval tag to which the survival time or the censoring time of the data is divided; $D_{uncensored}$ and $D_{censored}$ represent a set of uncensored data and a set of censored data, respectively; $h_a$ represents the probability that the ending event occurs in the $a^{th}$ interval; z represents the interval tag to which the survival time or the censoring time predicted by the model is divided, and the calculation formula of z is $z=\text{argmax}([h_0, h_1, h_2 \ldots h_{k-1}])$; S(t|X) represents the probability that the ending event still does not occur at the end of the time t, where the feature of the data is X, and Pr(z=T|X) represents the probability of z=T, where the feature of the data is X.

Finally, the time series deep survival analysis neural network model adds a dropout layer after each layer of recurrent neural network in the bidirectional LSTM recurrent neural network layer, and utilizes L1 and L2 regularization, so as to avoid over-fitting. At the same time, the model is trained by using mini-batching, 50% off cross validation and Adam optimizer.

The deep survival analysis network established by the present application can process time series data and extract feature modes of the data in the time dimension; the established deep survival analysis network can conveniently extract high-dimensional data; the present application establishes a novel sampling strategy based on the concordance index, which is responsible for screening the more meaningful and important part of data from the numerous right censored data to participate in the deep model learning; and the deep survival analysis network established by the present application can, combined with the idea of active learning and on the basis of the novel sampling strategy, conveniently sort a part of important data from the right censored data for labeling, so as to obtain more labeled data, and to obtain the best learning model with the smallest labeling cost.

The above descriptions are only embodiments of the present application, and are not used to limit the protection scope of the present application. Any modifications, equivalent replacements, improvement, and the like, made within the spirit and principle of the present application without creative work, shall all fall within the protection scope of the present application.

What is claimed is:

1. A time series deep survival analysis system combined with active learning for determining a survival time of a patient in the medical and health field, comprising: a data collector, an active learner, and a time series deep survival analyzer; wherein, the data collector is configured to obtain survival data of objects to be analyzed;

wherein the data collector transmits the survival data obtained by the data collector to a central processing unit (CPU), and the CPU processes and then transmits the survival data to the active learner, combined with an active learning method, the active learner selects a part of right censored data to label a survival time, according to an order of the right censored data in a censored data pool, which is specifically as follows:

step (1) putting all the survival data in a preparatory training set pool, in which time series features, survival times and whether censoring of all the objects to be analyzed are stored;

wherein the survival data is transmitted to the preparatory training set pool by a data distributor;

step (2) using a cox risk proportional regression model to perform cox regression analysis on a preparatory training set, so as to calculate a concordance index (Concordance Index, C-index)$C_0$;

step (3) putting all the right censored data in the censored data pool, in which the time series features and censoring times of all the objects to be analyzed are stored;

wherein the right censored data is transmitted to the censored data pool by the data distributor;

step (4) combined with the active learning method, according to a sampling strategy, sorting the data in the censored data pool, wherein the specific steps are as follows:

step (4.1) performing, for each data instance $I_i$ in the censored data pool, cox regression analysis on the data instance and all the uncensored data, so as to calculate a concordance index $C_i$, and meanwhile calculating a change in the concordance index $\Delta C_i=C_i-C_0$; and step (4.2) sorting the $\Delta C_i$ of the data instances in the censored data pool in an order from greatest to least; and step (5) selecting the most important batch of right censored data ranked first, labeling a survival time of selected right censored data, updating the labeled data into the preparatory training set pool, and recording whether censoring as NOT;

the time series deep survival analyzer constructs a time series deep survival analysis neural network model, and takes the uncensored data and the right censored data as model inputs, so as to obtain survival time prediction results of the objects to be analyzed;

the time series deep survival analysis neural network model comprises a time series data input layer, a bidirectional LSTM recurrent neural network layer, an attention mechanism layer, a fully connected layer and a softmax output layer, which are sequentially connected;

the survival time or the censoring time of each object to be analyzed is divided into k intervals at an interval of m days, so as to obtain an interval tag of each object to be analyzed, and a survival analysis problem is converted into a multi-category tag classification prediction problem;

the survival data, the survival time tag and whether censoring in the preparatory training set are input into the time series data input layer of the network model, and by means of the softmax output layer, each input data instance will output k values: $h_0, h_1, h_2 \ldots h_{k-1}$, representing the probabilities that an ending event occurs in the 0, 1 . . . (k−1) intervals, respectively;

a loss function $Loss_{all}$ of the time series deep survival analysis neural network model consists of two parts, which are denoted as $Loss_1$ and $Loss_2$, respectively:

$$\begin{aligned} Loss_1 &= -\log \prod_{(X,T)\in D_{uncensored} | (X,T)\in D_{censored}} S(T-1 \mid X) \\ &= -\sum_{(X,T)\in D_{uncensored} | (X,T)\in D_{censored}} \log\left[\prod_{l:l\le(T-1)} (1-h_l)\right] \\ &= -\sum_{(X,T)\in D_{uncensored} | (X,T)\in D_{censored}} \sum_{l:l\le(T-1)} \log(1-h_l) \end{aligned}$$

$$\begin{aligned} Loss_2 &= -\log \prod_{(X,T)\in D_{uncensored}} Pr(z=T \mid X) \\ &= -\log \prod_{(X,T)\in D_{uncensored}} \left[h_T \prod_{l:l\le T} (1-h_l)\right] \\ &= -\sum_{(X,T)\in D_{uncensored}} \left[\log h_T + \sum_{l:l\le T} \log(1-h_l)\right] \end{aligned}$$

$$Loss_{all} = Loss_1 + Loss_2$$

where, X represents a sum of the time series features of the data, comprising the time series features of s step lengths: $X_0, X_1, X_2 \ldots X_{s-2}, X_{s-1}$; T represents an interval tag to which the survival time or the censoring time of the data is divided; $D_{uncensored}$ and $D_{censored}$ represent a set of uncensored data and a set of censored data, respectively; $h_a$ represents the probability that the ending event occurs in an $a^{th}$ interval; z represents the interval tag to which the survival time or the censoring time predicted by the model is divided, and the calculation formula of z is $z=\text{argmax}([h_0, h_1, h_2 \ldots h_{k-1}])$; S(t|X) represents the probability that the ending event still does not occur at the end of the time t where the feature of the data is X, and Pr(z=T|X) represents the probability of z=T where the feature of the data is X.

2. The time series deep survival analysis system combined with active learning according to claim 1, wherein the system further comprises a result displayer for displaying the survival time prediction results.

3. The time series deep survival analysis system combined with active learning according to claim 1, wherein a dropout layer is added after each layer of recurrent neural network in the bidirectional LSTM recurrent neural network layer, so as to avoid over-fitting.

4. The time series deep survival analysis system combined with active learning according to claim 1, wherein the time-series deep survival analysis neural network model is trained by using mini-batching and Adam optimizer, and meanwhile L1 and L2 regularization are utilized to avoid over-fitting.

5. The time series deep survival analysis system combined with active learning according to claim 1, wherein medical electronic health records are time series data, and features thereof are closely related to time, right censored data thereof accounts for a relatively high proportion in survival data, the survival data is extracted from the medical electronic health records through the data collector, and a survival time of a patient is finally predicted by the system.

* * * * *